US009517944B2

(12) United States Patent
Senyuta et al.

(10) Patent No.: US 9,517,944 B2
(45) Date of Patent: Dec. 13, 2016

(54) METHOD FOR PRODUCING ALUMINA

(75) Inventors: Aleksandr Sergeevich Senyuta, St. Petersburg (RU); Andrey Vladimirovich Panov, St. Petersburg (RU)

(73) Assignee: United Company RUSAL Engineering and Technology Centre, LLC, Karsnoyarsk (RU)

( * ) Notice: Subject to any disclaimer, the term of this patent is extended or adjusted under 35 U.S.C. 154(b) by 33 days.

(21) Appl. No.: 14/415,958

(22) PCT Filed: Jul. 20, 2012

(86) PCT No.: PCT/RU2012/000592
§ 371 (c)(1),
(2), (4) Date: Jan. 20, 2015

(87) PCT Pub. No.: WO2014/014379
PCT Pub. Date: Jan. 23, 2014

(65) Prior Publication Data
US 2015/0175435 A1    Jun. 25, 2015

(51) Int. Cl.
*C01F 7/30*     (2006.01)
*C01F 7/34*     (2006.01)
(Continued)

(52) U.S. Cl.
CPC ............... *C01F 7/306* (2013.01); *C01F 7/34* (2013.01); *C01F 7/441* (2013.01); *C01F 7/56* (2013.01);
(Continued)

(58) Field of Classification Search
None
See application file for complete search history.

(56) References Cited

U.S. PATENT DOCUMENTS 4,110,399 A    8/1978   Gaudernack et al.
4,237,102 A    12/1980  Cohen et al.

FOREIGN PATENT DOCUMENTS

RU    2153466    7/2000
SU    1258815    9/1986

OTHER PUBLICATIONS

Elsner D. et al., "Alumina via hydrochloric acid leaching of high silica bauxites—process development," Light metals, 1984, pp. 411-426.

*Primary Examiner* — Melissa Swain
(74) *Attorney, Agent, or Firm* — Hogan Lovells US LLP

(57) ABSTRACT

The invention relates to metallurgy, in particular to acidic methods for producing alumina, and can be used in processing low-grade aluminum-containing raw material. The method for producing alumina comprises roasting an aluminum-containing raw material, treating said material with hydrochloric acid, salting out aluminum chloride by saturating the clarified chloride solution with gaseous hydrogen chloride, calcining aluminum chloride to produce aluminum oxide, and pyrohydrolyzing the mother liquor, with the return of hydrogen chloride to the acid treatment and salting out stages. To improve the quality of the alumina and to reduce energy consumption, the aluminum chloride, precipitated during the salting-out process, is treated with aqueous ammonia, the resulting precipitate is sent to calcination, and the ammonium chloride solution is mixed with said aluminum-containing raw material before or during the roasting thereof, ammonia released during the roasting is dissolved in water, and the resulting aqueous ammonia is sent to the treatment of aluminum chloride. The ammonium chloride solution, prior to mixing with the aluminum-containing raw material, may be subjected to stepwise evaporation with the repeated use of heating steam. The ammonium chloride (Continued)

released during the evaporation can be mixed with the aluminum-containing raw material.

3 Claims, 1 Drawing Sheet

(51) Int. Cl.
    *C01F 7/44*          (2006.01)
    *C01F 7/56*          (2006.01)
    *C01G 49/06*        (2006.01)
    *C22B 3/10*          (2006.01)
    *C22B 3/44*          (2006.01)
    *C22B 21/00*        (2006.01)

(52) U.S. Cl.
    CPC ................. *C01G 49/06* (2013.01); *C22B 3/10* (2013.01); *C22B 3/44* (2013.01); *C22B 21/0015* (2013.01); *C01P 2006/80* (2013.01); *Y02P 10/234* (2015.11)

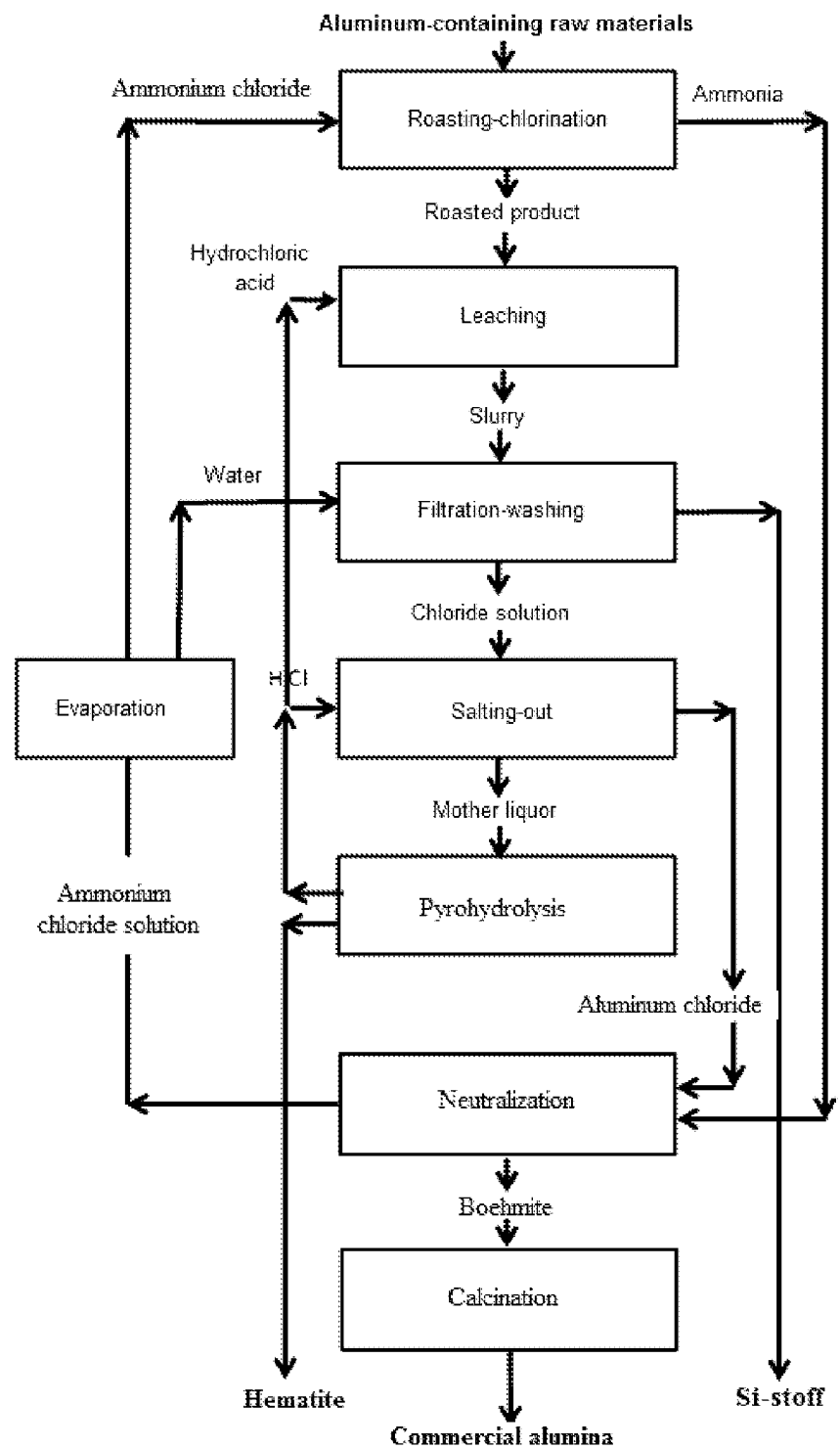

METHOD FOR PRODUCING ALUMINA

This application is a U.S. National Phase under 35 U.S.C. §371 of International Application PCT/RU2012/000592, filed on Jul. 20, 2012. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

The invention relates to metallurgy, in particular to acid methods for producing alumina, and can be used in processing low-grade aluminum-containing raw material.

What is known is a hydrochloric acid alumina production process comprising the acid treatment of pre-roasted raw material, evaporation of the clarified chloride solution with the crystallization of aluminum chloride hexahydrate ($AlCl_3.6H_2O$) followed by the calcination thereof to the oxide, which was called 'crude alumina' by the authors (Handbook for Metallurgists on Non-Ferrous Metals: Alumina Production Processes [in Russian]. Metallurgiya: Moscow, 1970, pp. 236-237) because of the high content of iron and other impurities (apart from silicon). This intermediate material was then processed by the conventional alkaline Bayer process in order to remove iron and other impurities to yield smelter grade alumina.

Deficiencies of said process include the excessive complexity of process design, high gross energy cost during its realization, chloride migration from the acid cycle to the alkali cycle, and additional alkali losses (up to 36-37 kg/tonne of alumina) related thereto. These are reasons why the process did not find industrial application.

Closest to the claimed method is a method for producing alumina from high-silica bauxites by hydrochloric acid leaching, said process involving the calcination of an aluminum-containing raw material at a temperature up to 700° C., the treatment thereof with hydrochloric acid, salting out of aluminum chloride by saturating a clarified chloride solution with gaseous hydrogen chloride, calcination of the aluminum chloride to yield aluminum oxide, and mother liquor pyrohydrolysis with the return of hydrogen chloride to the acid treatment and salting out stages (Elsner D., Jenkins D. H., and Sinha H. N. Alumina via hydrochloric acid leaching of high silica bauxites—process development. Light metals, 1984, p. 411-426).

According to said method, aluminum chloride hexahydrate is separated from the solution by salting out with gaseous hydrogen chloride, which allowed simplification of the process design, dispensing with the Bayer process, and reducing power costs. However, the content of impurities in the final product, especially chlorine and iron, is 2 to 3 times higher than the allowable limits for smelting grade alumina.

The disadvantages of said method also include an energy-intensive method of maintaining the water balance during the process cycle by using flash evaporation of recycled water during the pyrohydrolysis of iron chloride and other impurity chlorides.

By salting $AlCl_3.6H_2O$ out of the solution containing iron chlorides and other impurity metals, it is almost impossible to ensure high purity of the end product; calcination of such a product is the most power-consuming process. Thermal energy consumption during the calcination of aluminum chloride hexahydrate at 1100-1200° C. is 15 GJ/tonne of the obtained alumina. Moreover, during calcination, it is very difficult to eliminate residual chlorine which has a very negative impact during the electrolytic production of aluminum from alumina.

The invention is based on the object comprising the development of a method for producing smelter grade alumina from low-grade raw material, which allows low-grade, high-silica ores and waste to be processed.

The technical result is an improved alumina quality and reduction of energy consumption.

The above technical result is achieved in that in the method for producing alumina, comprising the roasting an aluminum-containing raw material, treating said material with hydrochloric acid, salting out aluminum chloride by saturating the clarified chloride solution with gaseous hydrogen chloride, calcining aluminum chloride to produce aluminum oxide, and pyrohydrolyzing the mother liquor, with the return of hydrogen chloride to the acid treatment and salting out stages, aluminum chloride, precipitated during the salting-out process, is treated with aqueous ammonia; the resulting precipitate is sent to calcination, and the ammonium chloride solution is mixed with said aluminum-containing raw material before or during the roasting thereof; ammonia released during the roasting is dissolved in water; the resulting aqueous ammonia is sent to the treatment of aluminum chloride.

The ammonium chloride solution, prior to mixing with the aluminum-containing raw material, may be subjected to a stepwise evaporation with the repeated use of heating steam.

The ammonium chloride released during the evaporation can be mixed with the aluminum-containing raw material.

During the processing of the $AlCl_3.6H_2O$ crystals with aqueous ammonia, aluminum chloride undergoes pseudomorphic transformation to partially dehydrated aluminum hydroxide, boehmite (AlOOH), with the desorption and washing out of iron compounds into the mother liquor of ammonium chloride, which in turn can be easily removed by washing with water. Thus, there is an additional purification of aluminum hydroxide. The particle sizes of the solid phase basically do not change.

Boehmite calcination requires only 2.15 GJ of thermal energy per 1 tonne of the obtained alumina.

During the treatment of aluminum chloride hexahydrate with aqueous ammonia, a solution of ammonium chloride is formed, which, in contrast to hydrochloric acid solutions, has no strong corrosive impact on equipment, and can be stepwise evaporated in a multiple-effect evaporator with steam heating with the repeated use of heating steam, which are widely used in the mineral salts and fertilizers industry and result in a 2-3-fold savings of heat consumed, compared with the flash evaporation of water as per the prior art, when all of the water introduced into the process cycle for washing the "si-stoff" (waste) was sent to pyrohydrolysis.

Ammonium chloride recycling can be efficiently carried out by adding the evaporated solution immediately before the roasting operation. It is also possible to recycle ammonium chloride in the form of crystals separated during the process of evaporating the solution.

At temperatures above 196° C., ammonium chloride decomposes into gaseous hydrogen chloride and ammonia. Hydrogen chloride reacts with components of the raw material, primarily with iron, and forms the corresponding chlorides. Released ammonia can be absorbed by the water and is sent in the form of an aqueous solution to the treatment of $AlCl_3.6H_2O$ crystals.

Extraction of aluminum into the solution, by virtue of its chemical properties, takes place mainly at the stage of hydrochloric acid treatment. Since the partial chlorination of the raw material occurs during roasting, there is less of a load on the hydrochloric acid treatment stage.

Thus, this method for producing alumina realizes hydrogen chloride (hydrochloric acid) recycling and ammonia recycling, which minimizes the consumption of reagents and thermal energy.

The essence of the invention is clarified with an alumina production process diagram. FIG. 1 is an alumina production process according to the invention.

The method for producing alumina is carried out as follows:

The aluminum-containing raw material mixed with ammonium chloride is sent to roasting, where said raw material undergoes partial thermal activation and ammonium chloride undergoes decomposition. Hydrogen chloride reacts with oxide components of the raw material, and free ammonia is absorbed by the water to form aqueous ammonia. Thus, the raw material passes through the roasting-chlorination stage.

Then, for a complete transfer of valuable components into solution, the roasted raw material is subjected to treatment with hydrochloric acid to produce a slurry which is separated (for example, by filtration) into a solid phase (waste "si stoff" comprising mostly silica) and a chloride solution, where the main target component is aluminum. Separation of aluminum is carried out by introducing gaseous hydrogen chloride into the solution; hydrogen chloride displaces (salts out) aluminum chloride hexahydrate in the form of crystals subjected to further treatment (neutralization) by aqueous ammonia coming from the roasting-chlorination stage, with the formation of partially dehydrated aluminum hydroxide (boehmite) and an ammonium chloride solution. Boehmite is sent to calcination to produce commercial alumina. The mother liquor after salting out aluminum chloride hexahydrate enters the pyrohydrolysis stage where hydroxides and oxides of other metals are formed (mainly, hematite) and hydrochloric acid is regenerated both as an aqueous solution and gaseous hydrogen chloride and returned to the stages of acidic treatment and aluminum chloride hexahydrate salting out.

The ammonium chloride solution is sent to step-wise evaporation with the repeated use of heating steam.

This method for producing alumina is illustrated with a specific example:

A weighed quantity (100 g) of raw material containing the following main components, %: $Al_2O_3$ 31.5; $SiO_2$ 5.7; $Fe_2O_3$ 35.2; $TiO_2$ 8.5; CaO 0.22; MgO 0.2; $Na_2O$ 0.25; $K_2O$ 0.15; $V_2O_5$ 0.1; $Cr_2O_3$ 0.12; $SO_3$ 0.25; other impurities 17.2, was mixed with a weighed quantity (200 g) of ammonium chloride. The mixture was placed in a lab tube furnace heated up to 300° C. and kept therein for 3 hours. Exhaust gaseous ammonia was passed through a water layer. The roasted material was dissolved in 20% hydrochloric acid at 98° C. for 3 hours. The resulting slurry was filtered, and aluminum chloride hexahydrate was crystallized from the clarified solution by salting out with gaseous hydrogen chloride. The filtered crystals were treated with aqueous ammonia. According to x-ray diffraction analysis results, the solid phase produced in this way was impurity-free boehmite (AlOOH). Boehmite, washed with water, was calcined in the muffle furnace at 1200° C. to produce alumina, whose chemical and granulometric composition met the requirements for smelter grade alumina (G-0).

The solution, after the salting out of aluminum chloride hexahydrate, was subjected to pyrohydrolysis to separate iron, titanium, and other minor impurities in the form of oxides, and to regenerate hydrogen chloride in the form of a hydrochloric acid solution and partially in the form of gaseous hydrogen chloride. The ammonium chloride solution, formed after treating $AlCl_3.6H_2O$ crystals with ammonia, was evaporated to separate the crystals of ammonium chloride which was also considered to be a recycled product.

The invention claimed is:

1. A method for producing alumina, comprising:
   mixing and roasting an aluminum-containing raw material with an ammonium chloride solution to produce a roasted raw material wherein said roasted raw material undergoes partial thermal activation and the ammonium chloride undergoes decomposition;
   dissolving the ammonia released during the roasting in water to form aqueous ammonia;
   treating said roasted raw material with hydrochloric acid to produce a slurry comprising a solid phase and a clarified chloride solution;
   salting out aluminum chloride by saturating the clarified chloride solution with gaseous hydrogen chloride to produce a mother liquor and aluminum chloride hexahydrate in crystalline form;
   subjecting the aluminum choride hexahydrate in crystalline form to treatment by the aqueous ammonia previously produced, to forming boehmite and an ammonium chloride solution;
   calcining the boehmite to produce aluminum oxide; and
   pyrohydrolyzing the mother liquor to form hematite and hydrochloric acid, wherein the hydrochloric acid is used in the treating of the roasted raw material step and the salting out aluminum chloride step.

2. The method according to claim 1, wherein the ammonium chloride solution, prior to mixing with the aluminum-containing raw material, is subjected to a stepwise evaporation with repeated use of heating steam.

3. The method according to claim 2, wherein the ammonium chloride released during the stepwise evaporation is mixed with the aluminum-containing raw material.

* * * * *